(12) United States Patent
Arrowood et al.

(10) Patent No.: US 7,949,527 B2
(45) Date of Patent: May 24, 2011

(54) MULTIRESOLUTION SEARCHING

(75) Inventors: Jon A. Arrowood, Smyrna, GA (US);
Robert W. Morris, Atlanta, GA (US);
Kenneth K. Griggs, Roswell, GA (US)

(73) Assignee: Nexidia, Inc., Atlanta, GA (US)

( * ) Notice: Subject to any disclaimer, the term of this patent is extended or adjusted under 35 U.S.C. 154(b) by 824 days.

(21) Appl. No.: 11/959,716

(22) Filed: Dec. 19, 2007

(65) Prior Publication Data
US 2009/0164217 A1    Jun. 25, 2009

(51) Int. Cl.
*G10L 15/04* (2006.01)
(52) U.S. Cl. .............................. 704/254; 704/257; 704/7
(58) Field of Classification Search .................. 704/251,
704/257, 270, 272, 276, 254, 7–10, 3, 4
See application file for complete search history.

(56) References Cited

U.S. PATENT DOCUMENTS

| | | | |
|---|---|---|---|
| 5,884,259 A | 3/1999 | Bahl et al. | |
| 6,345,253 B1* | 2/2002 | Viswanathan | ................ 704/272 |
| 7,263,484 B1 | 8/2007 | Cardillo et al. | |
| 2002/0157116 A1 | 10/2002 | Jasinschi | |
| 2004/0205461 A1 | 10/2004 | Kaufman et al. | |
| 2006/0129909 A1 | 6/2006 | Butt et al. | |

* cited by examiner

*Primary Examiner* — Huyen X. Vo
(74) *Attorney, Agent, or Firm* — Occhiuti Rohlicek & Tsao LLP

(57) ABSTRACT

This invention relates to processing of audio files, and more specifically, to an improved technique of searching audio. More particularly, a method and system for processing audio using a multi-stage searching process is disclosed.

29 Claims, 9 Drawing Sheets

170

|    | 1 | 2 | 3 | 4 | 5 | 6 | . | . | 121 |
|----|---|---|---|---|---|---|---|---|-----|
| 01 | $B_{1,1}$ | $B_{1,2}$ | $B_{1,3}$ | $B_{1,4}$ | $B_{1,5}$ | $B_{1,6}$ | ... | ... | $B_{1,121}$ |
| 02 | $B_{2,1}$ | $B_{2,2}$ | $B_{2,3}$ | $B_{2,4}$ | $B_{2,5}$ | $B_{2,6}$ | ... | ... | $B_{2,121}$ |
| 03 | $B_{3,1}$ | $B_{3,2}$ | $B_{3,3}$ | $B_{3,4}$ | $B_{3,5}$ | $B_{3,6}$ | ... | ... | $B_{3,121}$ |
| 04 | $B_{4,1}$ | $B_{4,2}$ | $B_{4,3}$ | $B_{4,4}$ | $B_{4,5}$ | $B_{4,6}$ | ... | ... | $B_{4,121}$ |
| 05 | $B_{5,1}$ | $B_{5,2}$ | $B_{5,3}$ | $B_{5,4}$ | $B_{5,5}$ | $B_{5,6}$ | ... | ... | $B_{5,121}$ |
| 06 | $B_{6,1}$ | $B_{6,2}$ | $B_{6,3}$ | $B_{6,4}$ | $B_{6,5}$ | $B_{6,6}$ | ... | ... | $B_{6,121}$ |
| . | . | . | . | . | . | . | ... | ... | . |
| . | . | . | . | . | . | . | ... | ... | . |
| . | . | . | . | . | . | . | ... | ... | . |

FIG. 6

|   | 1 | 2 | 3 | 4 | 5 | 6 |
|---|---|---|---|---|---|---|
| 01 | $B_{1,1}$ | $B_{1,2}$ | $B_{1,3}$ | $B_{1,4}$ | $B_{1,5}$ | $B_{1,6}$ |
| 02 | $B_{2,1}$ | $B_{2,2}$ | $B_{2,3}$ | $B_{2,4}$ | $B_{2,5}$ | $B_{2,6}$ |
| 03 | $B_{3,1}$ | $B_{3,2}$ | $B_{3,3}$ | $B_{3,4}$ | $B_{3,5}$ | $B_{3,6}$ |
| 04 | $B_{4,1}$ | $B_{4,2}$ | $B_{4,3}$ | $B_{4,4}$ | $B_{4,5}$ | $B_{4,6}$ |
| 05 | $B_{5,1}$ | $B_{5,2}$ | $B_{5,3}$ | $B_{5,4}$ | $B_{5,5}$ | $B_{5,6}$ |
| 06 | $B_{6,1}$ | $B_{6,2}$ | $B_{6,3}$ | $B_{6,4}$ | $B_{6,5}$ | $B_{6,6}$ |

FIG. 7A

|   | 1/2 | 3/4 | 5/6 |
|---|---|---|---|
| 01 | $B_{1,A}$ | $B_{1,B}$ | $B_{1,C}$ |
| 02 | $B_{2,A}$ | $B_{2,B}$ | $B_{2,C}$ |
| 03 | $B_{3,A}$ | $B_{3,B}$ | $B_{3,C}$ |
| 04 | $B_{4,A}$ | $B_{4,B}$ | $B_{4,C}$ |
| 05 | $B_{5,A}$ | $B_{5,B}$ | $B_{5,C}$ |
| 06 | $B_{6,A}$ | $B_{6,B}$ | $B_{6,C}$ |

| | 1 | 2 | 3 | 4 | 5 | 6 |
|---|---|---|---|---|---|---|
| 01 | $B_{1,1}$ | $B_{1,2}$ | $B_{1,3}$ | $B_{1,4}$ | $B_{1,5}$ | $B_{1,6}$ |
| 02 | $B_{2,1}$ | $B_{2,2}$ | $B_{2,3}$ | $B_{2,4}$ | $B_{2,5}$ | $B_{2,6}$ |
| 03 | $B_{3,1}$ | $B_{3,2}$ | $B_{3,3}$ | $B_{3,4}$ | $B_{3,5}$ | $B_{3,6}$ |
| 04 | $B_{4,1}$ | $B_{4,2}$ | $B_{4,3}$ | $B_{4,4}$ | $B_{4,5}$ | $B_{4,6}$ |
| 05 | $B_{5,1}$ | $B_{5,2}$ | $B_{5,3}$ | $B_{5,4}$ | $B_{5,5}$ | $B_{5,6}$ |
| 06 | $B_{6,1}$ | $B_{6,2}$ | $B_{6,3}$ | $B_{6,4}$ | $B_{6,5}$ | $B_{6,6}$ |

FIG. 9B

| | A | B | C |
|---|---|---|---|
| a | $B_{a,A}$ | $B_{a,B}$ | $B_{a,C}$ |
| b | $B_{b,A}$ | $B_{b,B}$ | $B_{b,C}$ |

MULTIRESOLUTION SEARCHING

TECHNICAL FIELD

This invention relates to processing of audio files, and more specifically, to an improved technique of searching audio.

BACKGROUND OF THE INVENTION

Stored documents and audio files may be searched in a wide variety of situations. The user may wish to search a video recording for specific topics, or may wish to search a textual file. Typically, a search string is entered by a user and the search string is compared to a stored file. When a match is found, an indication of such is conveyed to the user.

SUMMARY OF THE INVENTION

In some aspects, a method for searching an audio source for occurrence of a search string includes processing the audio source to generate a first representation of the audio source that includes scores associated with the occurrence of a plurality of audio states and generating a second representation of the audio source. The second representation can have a plurality of parts where each part corresponds to a different part of the first representation and the second representation can have fewer entries than the first representation. The method also includes using the search string and the second representation to determine a set of candidate locations in the audio source and searching the candidate locations using the search string and the first representation.

Embodiments can include one or more of the following.

Generating the second representation of the audio source can include processing the first representation to generate the second representation. Processing the audio source to generate the first representation can include processing the audio source according to a first set of audio states independently of the search string and generating the second representation of the audio source can include processing the audio source according to a second set of audio states independently of the search string.

The first representation can be a first matrix having a time frame dimension and a state dimension and the probabilities associated with the occurrence of a plurality of audio states can be stored as entries in the first matrix. The second representation can be a second matrix having a time frame dimension and a state dimension and the second matrix can have fewer entries than the first matrix.

Generating the second representation of the audio source can include processing the first matrix to generate the second matrix. Processing the first matrix to generate the second matrix can include reducing a number of states. Each part of the second representation can be a quantization of quantities in the corresponding part of the first representation.

The first representation can be a first lattice and the second representation can be a second lattice. The second lattice can have fewer entries than the first lattice. Generating the second representation of the audio source can include processing the first lattice to generate the second lattice.

States of the second representation can correspond to classes of states of the first representation. Processing the first representation to generate the second representation can include reducing a number of states in the state dimension. The states can include states of phonemes and reducing the number of states can include reducing the number of states for at least some of the phonemes. Reducing the number of states can include reducing the number of states from two-states-per-phoneme in the first representation to one-state-per-phoneme in the second representation. Processing the first representation to generate the second representation can include merging phonemes in the first representation by class to generate the second representation. Processing the first representation to generate the representation can include reducing a frame rate. Reducing the frame rate can include reducing the frame rate by a factor of 3 or greater. Processing the first representation to generate the second representation can include reducing a number of states and reducing a frame rate. Processing the first matrix to generate the second matrix can include reducing a number of states by a factor of at least about two and reducing a frame rate by a factor of at least about three.

The method can also include accepting the search string, generating a first representation of the search string for use with the first representation of the audio source, and generating a second representation of the search string for use with the second representation of the audio source. Using the search string and the second representation to determine a set of candidate locations in the audio source can include using the second representation of the search string and the second representation of the audio source to determine a set of candidate locations in the audio source and searching the candidate locations using the search string and the first representation comprises searching the candidate locations using the first representation of the search string and the first representation of the audio source.

The method can also include generating a third representation of the audio source, the third representation having a plurality of parts where each part in the first representation corresponds to a different part of the third representation and the first representation includes fewer entries than the third representation. The set of candidate locations can be a first set of candidate locations and searching the candidate locations using the search string and the first representation can include generating a second set of candidate locations. The method can also include searching the second set of candidate locations using the search string and the third representation.

In some aspects, a method for searching an audio source for occurrence of a search string includes processing the audio source to generate a first matrix or lattice. The first matrix or lattice includes probabilities associated with the occurrence of a plurality of audio states within a time frame. The method also includes processing the first matrix or lattice to generate a second matrix or lattice that includes probabilities associated with the occurrence of a plurality of audio states within a time frame where the second matrix or lattice has fewer entries than the first matrix or lattice. The method also includes determining a set of candidate locations in the audio source by searching for the search string using the second matrix or lattice and searching the candidate locations using the search string and the first matrix or lattice.

In some aspects, a method for searching an audio source for occurrence of a search string includes processing the audio source according to a first set of audio states independently of the search string. The method also includes storing, for a plurality of time frames, a first set of quantities characterizing probabilities associated with the occurrence of each of the audio states in the first set of audio states. The method also includes processing the audio source according to a second set of audio states independently of the search string. The method also includes storing, for a plurality of time frames, a second set of quantities characterizing probabilities associated with the occurrence of each of the audio states in the second set of audio states where the second set of audio states includes fewer audio states than the first set of audio states.

The method also includes accepting the search string. The method also includes using the search string and the second set of quantities to identify a set of candidate locations in the audio source and using the search string and the first set of to search for the search string within the identified candidate locations.

Embodiments can include one or more of the following.

The method can include providing a set of one or more hits for the search string in the audio source based on a result of the search of the candidate locations. The first set of audio states can include $R_1$ plus $M_1$ time $N_1$ states, where $M_1$ is a number of states per phoneme, $N_1$ is a number of different phonemes, and $R_1$ is a number of bridge states. The second set of audio states can include $R_2$ plus $M_2$ time $N_2$ states, where $M_2$ is a number of states per phoneme, $N_2$ is a number of different phonemes, and $R_2$ is a number of bridge states, where $M_1$ is less than $M_2$.

The first set of audio states can include $R_1$ plus $M_1$ time $N_1$ states, where $M_1$ is a number of states per phoneme, $N_1$ is a number of different phonemes, and $R_1$ is a number of bridge states. The second set of audio states can include $R_2$ plus $M_2$ time $N_2$ states, where $M_2$ is a number of states per phoneme, $N_2$ is a number of different phonemes, and $R_2$ is a number of bridge states where $N_1$ is less than $N_2$.

Processing the audio source according to a first set of audio states can include constructing a first matrix having a time frame dimension and a state dimension, each entry in the first matrix representing a quantity characterizing a probability of an audio state occurring in a time frame. Processing the audio source according to a second set of audio states can include constructing a second matrix having a time frame dimension and a state dimension. Each entry in the second matrix can represent a quantity characterizing a probability of an audio state occurring in a time frame and the second matrix can have less entries in the time frame dimension that the first matrix. The set of candidate locations can include locations in the audio source having a shorter duration than the entire audio source.

In some aspects, the two pass processing provides the advantage of more quickly finding search terms by first finding candidate locations and then scoring the candidate locations more accurately with a higher time and/or state resolution. In addition, false alarms are potentially reduced because the coarse match is required in the first pass before a more detailed scoring is done at higher resolution.

In some aspects, the index files can be arranged such that the likelihoods are grouped into regions spanning a sequence of time frames and a set of related states. This provides the advantage of reducing the size of the matrix representing the index file. For example, the likelihoods of three time frames and all the states of a phoneme can be grouped. In some embodiments, this group of scores can be represented as a coefficient in a vector quantization approach (effectively replacing the group with a representative exemplar (codeword) of the group of likelihoods).

In some aspects, it is believed that the multipass system can provide search results at a higher speed than a single pass system and can provide a desired level of accuracy within the results.

The foregoing and other advantages of the present invention will become apparent as the following description of the preferred embodiment and drawings are reviewed.

BRIEF DESCRIPTION OF THE DRAWINGS

FIG. 6 shows an N×M matrix, where N is the number of states in the acoustic model, and M is the number of frames of speech.

FIG. 7A shows a portion of the matrix of FIG. 6.

FIG. 7B shows a portion of a reduced matrix generated based on the matrix of FIG. 7A.

FIG. 9A shows a portion of the matrix of FIG. 6.

FIG. 9B shows a portion of a reduced matrix generated based on the matrix of FIG. 9A.

DESCRIPTION

Single-Stage Search

Figure 1:
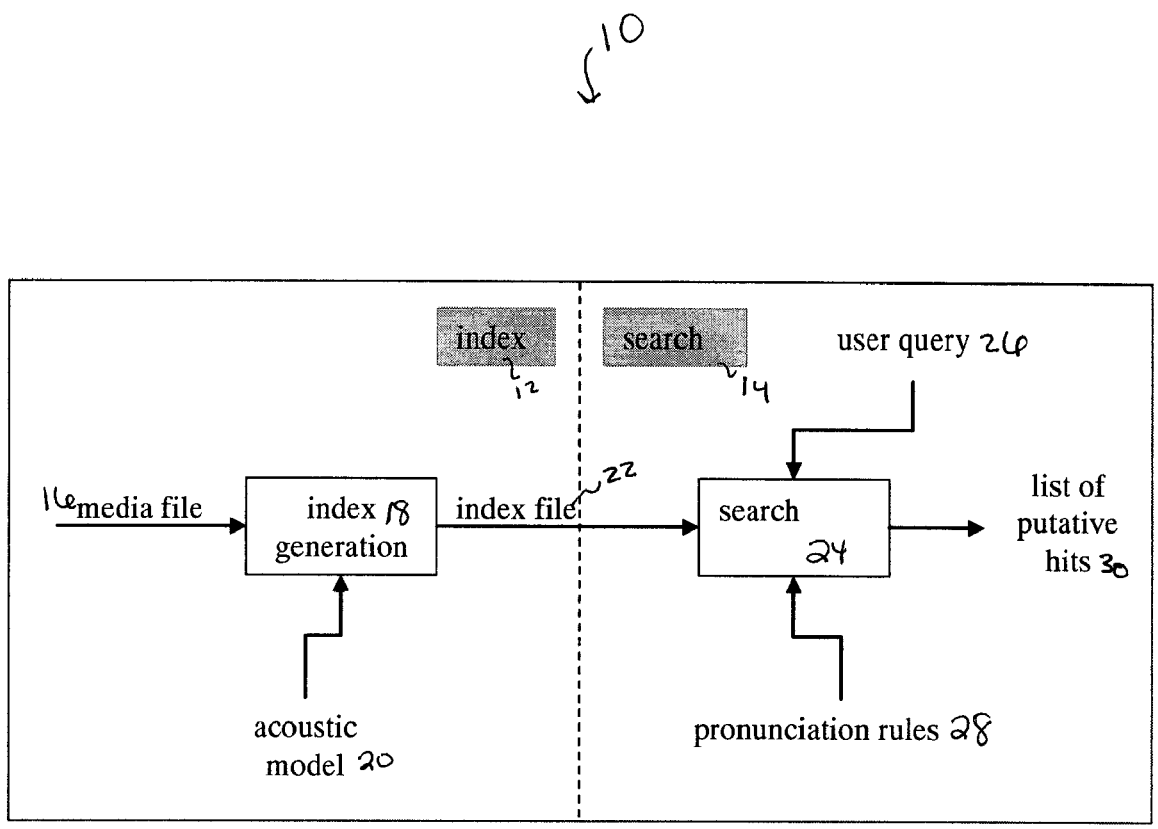
FIG. 1 shows a wordspotting system that uses a single stage search.

FIG. 1 shows a wordspotting system 10 that includes an indexing portion 12 configured to index a media file and a searching portion 14 configured to perform a search for a user input query based on the indexed media file. The indexing portion 12 receives a media file 16 and uses an acoustic model 20 to generate a query-independent index 22 that describes the phonetic content of the media file 16. This query-independent index 22 can either be searched immediately in memory, or archived and searched in the future for any possible query. The searching portion 14 of wordspotting system 10 receives a user query 26 and pronunciation rules 28 and searches the index 22 for the query 26. The query can be entered as a phonetic representation of one or more search terms, as a text based input and/or as an audio input. Exemplary implementations of such a system include those that generate a phonetic lattice, those that create a sub-word unit lattice, or acoustic keyword spotting techniques such as those described in U.S. Pat. No. 7,263,484 titled "Phonetic Searching" issued on Aug. 28, 2007, the contents of which are hereby incorporated by reference. For example, the matrices for searching described in U.S. Pat. No. 7,263,484 can be similar to the indexes and matrices referred to herein.

Wordspotting system 10 can search an entire media file and/or can perform a "windowed search" in which the search can begin at any frame of the index and the search processes only a short segment of the media file. It is believed that, as long as there is a modest overlap (a few frames on either side of a word or phrase) a windowed search for that word or phrase will return a result with almost the same score as the hit that would have been returned for that section of audio in the case of searching the whole index. Wordspotter 10 also provides the advantage of providing a variable number of results. More particularly, wordspotting, unlike speech-to-text, is a detection task, with either an implicit or explicit threshold value. By lowering the threshold, more results are returned, increasing the chances that all occurrences of the desired query are found. This is, however, at the cost of raising the number of false alarms that will be returned.

Dual-Stage Search

Figure 2:
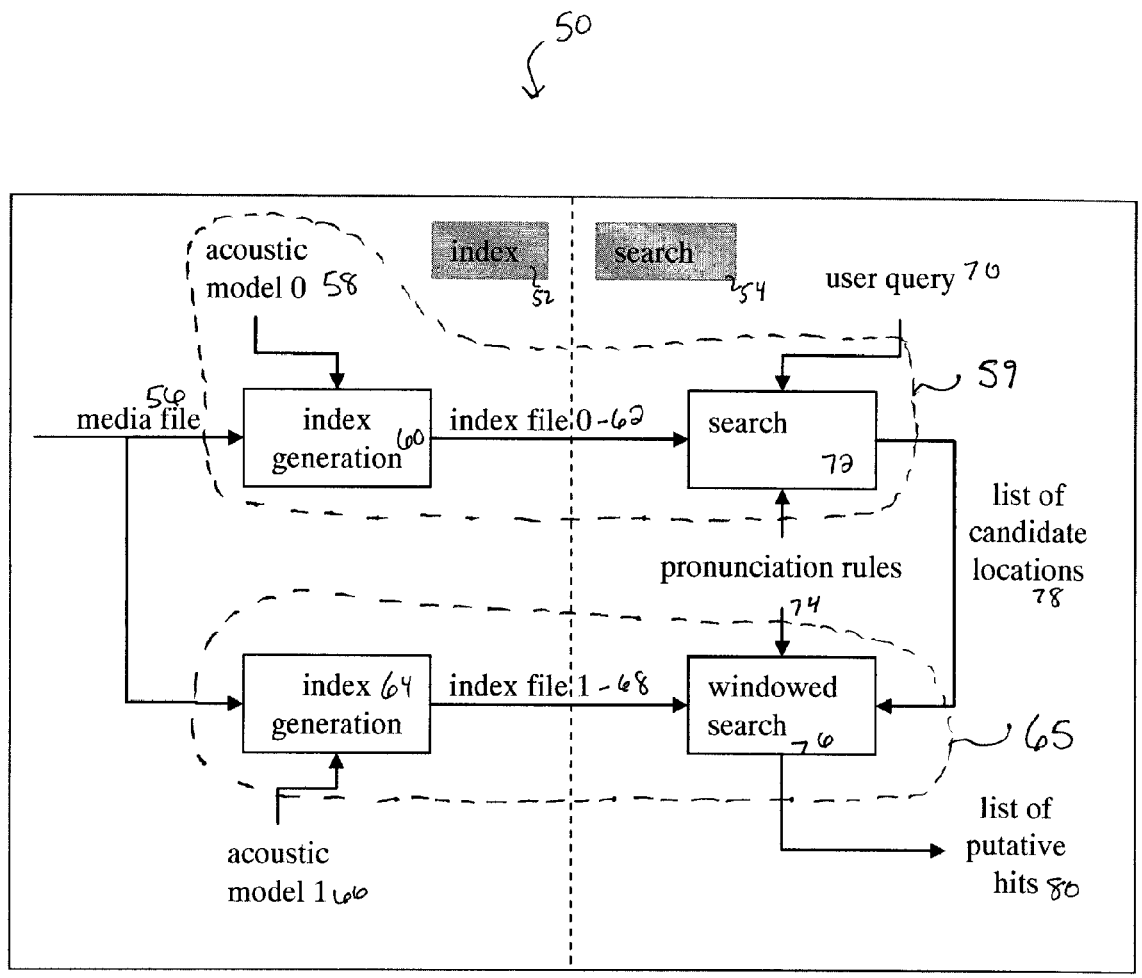
FIG. 2 shows a wordspotting system that uses a dual stage search.

FIG. 2 shows a wordspotting system 50, which is a first example of a wordspotting system that uses a two-stage approach to perform the wordspotting. In this example, the two-stage approach uses two independent word spotting systems 59 and 65, each of which perform indexing of a media file 56 and searching of the indexed media file in order to increase the search speed of system 50 in comparison to a single stage search.

More particularly, system 50 includes an indexing portion 52 configured to generate multiple indexes based on a single media file 56 and a searching portion 54 configured to perform a searches for a user input query 70 based on the indexed media files. The indexing portion 52 includes two index generation processes 60 and 64 associated with systems 59 and 65, respectively. Index generation process 60 of system 59 receives a media file 56 and generates an index file 62 based on an acoustic model 58. Similarly, index generation process 64 of system 65 receives the media file 56 and generates another index file 68 based on a different acoustic model 66. The same media file 56 is used by generation processes 60 and 64 to generate the index files 62 and 68; however, the index files 62 and 68 can have different levels of detail. For example, the acoustic model 58 used to generate the index file 62 produces an index file that has a lower time resolution and/or fewer states than the index file 68 produced using the acoustic model 66. As such, the accuracy of a search performed using system 59 and the index file 62 is generally lower than the accuracy of a search performed using system 65 and the index file 68 while the amount of time necessary to perform a search using system 59 and index file 62 is generally less than the amount of time necessary to perform a search using system 65 and index file 68.

The searching portion 54 of system 50 includes two searching processes 72 and 76 which are based on the index files 62 and 68 and associated with systems 59 and 65, respectively. Since the index file 62 is smaller than index file 68, the searching performed by searching process 72 per second of audio searched is faster than the searching performed by searching process 76 per second of audio searched. Searching processes 72 and 76 are used in conjunction to generate a list of putative hits 80 based on a user input query 70. More particularly, the system 50 receives a user query 70 and generates different phonetic representations of the search query 70 used by searching processes 72 and 76. The system 50 uses pronunciation rules 74 to generate a search in a format appropriate for the index file which will be searched. System 50 performs a first search of the full audio using system 59 and searching process 72 based on the index file 62. This searching provides a lower accuracy set of results that can be used by the system 65 and searching process 76 as a list of candidate locations within which to perform a windowed search. The windowed search can be limited to the short segments identified as potential candidate locations 78 by the searching process 72 of system 59. As such, the two-stage searching allows a high-speed search of the audio using process 72 and a more accurate but slower search of a subset of location in the audio using search 76.

Figure 3:
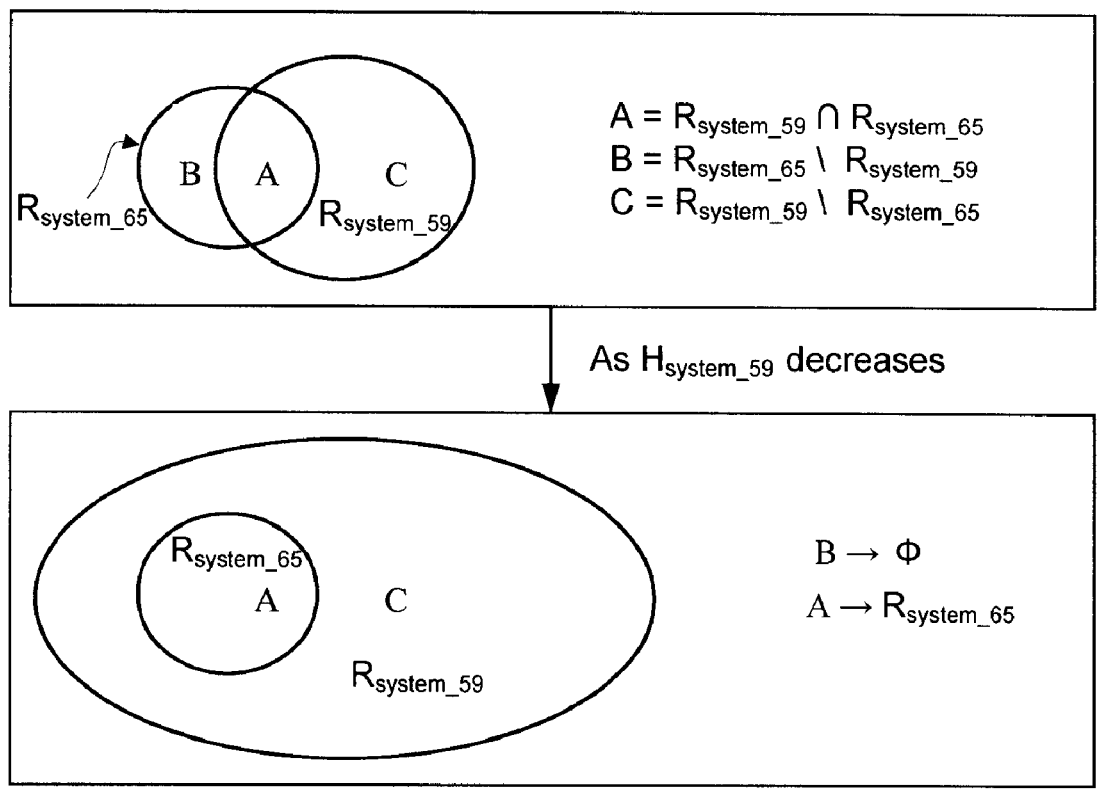
FIG. 3 shows a Venn diagram.

The resolution of search 72 of system 59 and search 76 of system 65 can be selected to ensure that a desired accuracy (e.g., recall and precision) in the list of putative hits 80 generated by system 50 is achieved. Without being bound to the following analysis of how the two-stage system operates or should be configured, in general, when two different searches are performed the thresholds of the two searches can be selected to generate the desired results (e.g., provide the desired searching speed, recall, and/or precision). An example of such a selection process can be explained with reference to the Venn diagrams shown in FIG. 3. The Venn diagrams describe set relationships between the identified hits as the threshold, $H_{system\_59}$, for the lower resolution search 72 using system 59 is modified. First, let the total set of results above some threshold $H_{system\_65}$ from a reference search using the higher resolution search (referred to in this example as System 65) be called $R_{system\_65}$. Similarly, let the total results above some other threshold $H_{system\_59}$ using the lower resolution search (referred to in this example as System 59) be called $R_{system\_59}$. The accuracy of System 59 is lower than System 65, but wordspotting allows an arbitrary number of results to be returned. If $H_{system\_59}$ is lowered sufficiently, $R_{system\_59}$ can be expected to grow to be much larger than $R_{system\_65}$. It can also be expected that as $R_{system\_59}$ grows, the set becomes large enough to encompass almost all results that would have returned a high score from System 65 using the higher accuracy search, albeit these will be intermixed with many System 59 results that did not appear in the reference System 65 output. We can express $R_{system\_65}$ as the union of A and B, where A are results that also appear in $R_{system\_59}$, and B are results that do not. We can express $R_{system\_59}$ as the union of A and C, where C is a large set of results that do not appear in $R_{system\_65}$. As $H_{system\_59}$ is lowered, $R_{system\_59}$ will grow monotonically. Likewise, A and C will also grow monotonically in size, and B will shrink monotonically. If $H_{system\_59}$ is lowered enough, A will eventually equal $R_{system\_65}$, and B will be the empty set. For the purposes of this implementation, however, it is sufficient that A be similar in size to $R_{system\_65}$.

Each element of $R_{system\_59}$ can now be used as a candidate location to go back to the index from System 65 and perform a windowed search (e.g., using searching process 76 and index file 68). Each windowed search ideally gives the same score as this region would give during a full System 65 search. This results in re-ordering the set $R_{system\_59}$, with those hits that are in the set A receiving their original System 65 score (which is necessarily above threshold $H_{system\_65}$) and those hits that are not in A (and thus in C) also receiving their original System 65 score (which is necessarily below $H_{system\_65}$). By re-thresholding the rescored results, the final output is now the set A.

By setting $H_{system\_59}$ low enough that A is almost all of $R_{system\_65}$, the two-step searching process of system 50 will have a recall rate similar to system 10 which uses a single higher accuracy search for any $H_{system\_65}$. As for precision, if we make the conservative assumption that the elements of the set B will be uniformly distributed across $R_{system\_65}$, then precision of using a two step searching process with a first search having a lower accuracy followed by a second windowed search (e.g., using system 50) and the precision of searching the entire audio using the higher accuracy search (e.g., using system 10) will be similar or even identical. In the more likely scenario that the elements of B are more likely to be the lower-scoring elements of $R_{system\_65}$, the expected performance of System 50 is to have slightly higher precision than System 10.

While in the example shown in the Venn diagrams, $H_{system\_59}$ is set low enough that A is almost all of $R_{system\_65}$ such that the two-step searching process of system 50 will have a recall rate similar to system 10 which uses a single higher accuracy search for any $H_{system\_65}$, other values of $H_{system\_59}$ can be selected. For example, a user might desire to increase the precision of hits by selecting $H_{system\_59}$ to have a higher threshold such that fewer candidate locations are produced by the first search than would be produced using the single higher accuracy search for any $H_{system\_65}$. In some additional examples, $H_{system\_59}$ can be selected based on a desired speed of a search and the accuracy of the search may vary due to the threshold to enable the search to be performed in the desired length of time.

In terms of computation cost, the indexing step of the two stage system 50 incurs the cost of generating the index file 62 plus the cost of generating index file 68. For search, however, the overall time required may be reduced. Full search over the entire time interval only happens on index file 62, and windowed search of candidate locations only requires searching a few seconds of audio for each candidate. For example, consider a candidate rate of 60 locations per hour of audio, and a two second search window per candidate location. This would mean searching, using the higher accuracy searching process 76 and index file 68, 120 seconds of candidate location audio for every hour and using the faster lower accuracy search to search the full one hour (i.e. 3600 seconds) of original audio. This gives the total time required for a search to be T2=T0+(120/3600)T1. Where T2 is the total search time using system 50, T0 is the search time to generate the candidate locations using process 72 and T1 is the time to search the entire audio using process 76. With such a rate of candidate locations, so long as the search time of the lower accuracy search 72 is less than $^{29}\!/_{30}$ths the time required for the higher accuracy search using search 76, the search of System 50 has a speed improvement over System 10.

Multi-Resolution Dual-Stage Search

Figure 4:
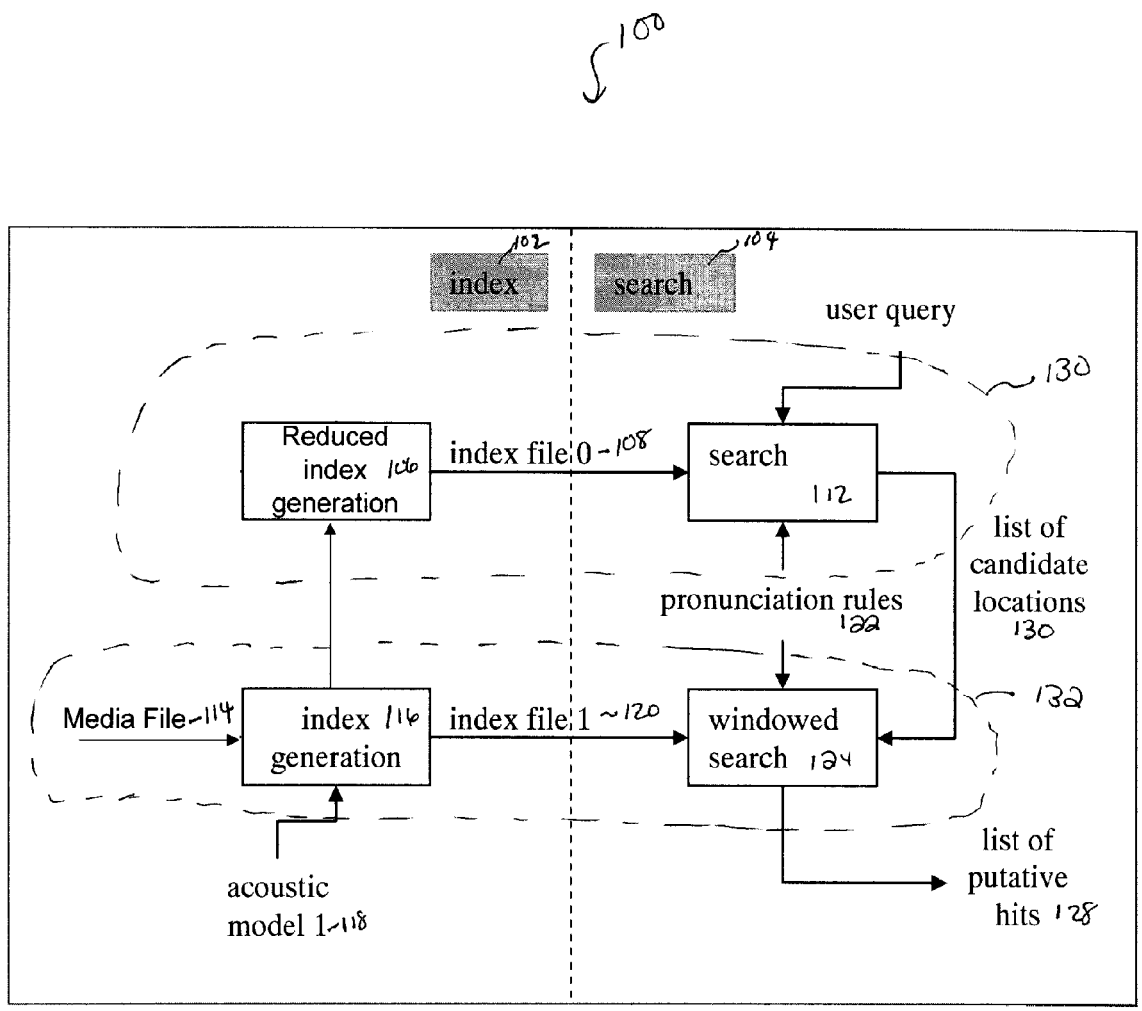
FIG. 4 shows a wordspotting system that uses a dual stage search.

In the example above, system 50 separately indexes the media file 56 using index generation processes 60 and 64 to generate the index files 62 and 68. While performing searching using the two different searching processes 72 and 76 based on the different resolution index files 62 and 68 can increase the speed of the searching, the generation of the two index files 62 and 68 can result in a slower indexing speed and generally requires more storage for the two separate index files. In some embodiments, the speed of indexing can be addressed using a multiresolution system such as the multiresolution system 100 shown in FIG. 4. In multiresolution system 100 the index used in the lower resolution searching system is derived from the index used in the higher resolution system.

Multiresolution system 100 includes two searching systems 130 and 132. System 130 operates at a generally lower accuracy and higher speed compared to system 132. In general, system 130 is used to search all or substantially all of the media file to identify candidate locations 126. System 132 then performs a windowed search of the audio at the identified candidate locations 126 within the media file.

System 100 generates two separate index files 108 and 120 using an index generation process 116 and a reduced index generation process 106. The index generation process 116 receives a media file 114 and generates an index file 120 based on an acoustic model 118. The reduced index generation process 106 uses the index file 120 generated by the index generation process 116 and generates an index file 108 that is smaller in size than the index file 120. For example, index file 108 may have fewer phonetic states and/or have a lower frame-rate than index file 120. As such, the accuracy of a search performed by system 130 using the index file 108 is generally lower than the accuracy of a search performed by system 132 using the larger index file 120 while the amount of time necessary to perform a search using the index file 108 is generally less than the amount of time necessary to perform a search using the index file 120.

Since the number of phonetic states and/or the frame-rate differs between the index file 108 and 120, a representation of the user input search term used to search index file 108 will differ from a representation of the user input search term used to search index file 120. For example, if index file 108 has fewer phonetic states than index file 120, a representation of a user input search term used to search index file 108 will be based on the reduced set of phonetic states included in file 108 while the representation of the search term used to search the index file 120 will be based on the larger set of phonetic states.

The searching portion 104 of system 100 includes two searching processes 112 and 124 which perform searches using the index files 108 and 120, respectively. Since the index file 108 is smaller than index file 120, the searching performed by searching process 112 per second of audio searched is faster than the searching performed by searching process 124 per second of audio searched. Searching processes 112 and 124 are executed sequentially to generate a list of putative hits 128 based on a user input query 110. More particularly, the system 100 receives a user query 110 and performs a first search using searching process 112 based on the reduced index file 108. This searching provides a low accuracy set of results that can be used by the searching process 124 as a list of candidate locations within which to perform windowed searches limited to the short segments identified as potential candidate locations 130.

In some embodiments, system 132 uses a phonetic lattice keyword spotting and the index file 120 in system 132 is a lattice of nodes. In the lattice of nodes, each node represents a single acoustic unit such as a phoneme, along with its probability-like score and onset and offset times. Arcs in the lattice represent possible transitions from acoustic unit to acoustic unit (e.g., from phoneme to phoneme). The number of nodes in the lattice retained affects both the size of the index file 120, and the speed of search.

Figure 5A:
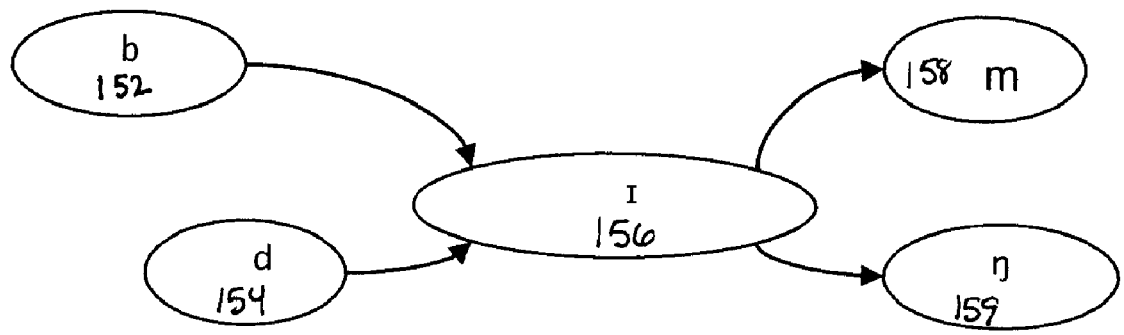
FIG. 5 shows an exemplary grouping nodes in a lattice file.
Figure 5B:
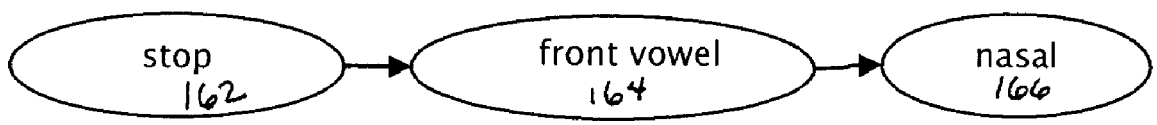

In some examples in which index 120 is a phoneme lattice, the index file 120 of system 132 is generated by merging nodes in the lattice of index file 120. Various methods can be used to merge the nodes in the lattice. For example, in some embodiments, phoneme labels can be replaced with phoneme-class labels to reduce the size of the lattice by merging similar nodes. For example, FIGS. 5A and 5B show an example of grouping nodes in the lattice file to generate phoneme classes based on the type of sounds. In this example, all of the stop consonants are grouped together as a single type of unit, nasals as another, and the like. After grouping the nodes, an index (as shown in FIG. 5B) includes a smaller number of entries and can therefore be searched more quickly. For example, rather than have separate entries 152 and 154 in the lattice for 'b' and 'd,' these two phonemes can be merged into a single 'stop consonant' entry 162.

Since the number of entries in the lattice is reduced by merging the entries in the lattice to generate a reduced lattice, the search terms used to search the full lattice and the reduced lattice are adjusted accordingly. For example, in the example above separate entries for a particular class or type of sounds were grouped in the reduced lattice. As such, the representation of the search term is modified for searching based on the combined class or type of sounds that are represented in the reduced lattice. Using the example in FIGS. 5A and 5B, if a user desires to search for the term "dim" using both the full lattice and the reduced lattice, the system would generate two different representations of the term "dim." The representation of the term used to search the full lattice (e.g., FIG. 5A) would include in sequence the phonetic models for d, i, and m. In contrast, representation of the term used to search the reduced lattice (e.g., FIG. 5B) would include the grouped class or type of sounds associated with each of the phonetic entries. In this example, when searching for the word "dim" the system would search for a stop sound followed by a front vowel followed by a nasal sound.

Referring back to FIG. 4, generating the derived index file 108 requires only a relatively small amount of post-processing after creation of the index file 120, compared to generating an index based on the media file (e.g., as described above in FIG. 2). Further, as there are far fewer units in index file 108, and especially because similar units collapse on top of one another and it is similar units in particular that will exist on top of one another, lattice depth will be greatly reduced. This implies a much smaller representation. By reducing the lattice, the time required for a linear search through the lattice is also reduced.

In some embodiments, system 132 uses a matrix representation for the index file. In the matrix representation for the index file, each entry represents a probability-like score for a state in an acoustic model. The number of entries in the index file affects both the size of the index file 120 and the speed of search.

For example, referring to FIG. 6, the index file 120 in system 132 can be described by a matrix that has dimensions N×M, where N is the number of states in the acoustic model and M is the number of frames of speech (as represented by the columns and rows, respectively, of matrix 170 in FIG. 6). In some embodiments, each phoneme has multiple states (e.g., two or three states) so the number of states (e.g., number of columns in matrix 170) will be a multiple of the number of phonemes in the language. In general, depending on the linguistic representation, the number of phonemes can be in a range from about 30 to about 60. The framerate determines the number of frames (e.g., number of rows in matrix 170) for a given duration input file. An exemplary framerate, $F_1$, for System 132 is $F_1$=100 frames per second. In a system with P phonemes, where P=40, two states per phoneme, and T seconds of audio, this implies a matrix that includes $2P \times F_1 T$ or 80×100T entries.

In some embodiments, the multiresolution system 100 can be generated by letting the matrix 170 be approximated by performing a transformation the matrix 170 to generate a smaller matrix (e.g., a matrix having fewer entries per second of audio). One example method of reducing the size of matrix 170 is shown in FIGS. 7A and 7B. FIG. 7A shows a portion 180 of the matrix 170 and FIG. 7B shows the portion of the matrix subsequent to the transformation of the matrix in FIG. 7A. The size of the matrix 180 is reduced by merging the scores for the different states of each phoneme. For example, assuming that entries 184 and 186 are two different states associated with the same phoneme, the entries 184 and 186 can be grouped as indicated by 182 and merged into a single entry 192 in a matrix 190 that has a reduced size. Merging the different states of the phonemes reduces the number of columns in the matrix. Possible methods for merging the scores are to take the average of the scores, take the maximum score, or take the minimum score. If a two-state-per-phoneme system having 40 phonemes is reduced to just one state-per-phoneme, the number of entries in the full matrix is $2P \times F_1 T$, or 80×100T and the number of entries in the matrix approximated System 130 matrix is $P \times F_1 T$, or 40×100T. Similarly, if a three-state-per-phoneme system having 40 phonemes is reduced to just one state-per-phoneme, the number of entries in the full matrix is $3P \times F_1 T$ or 120×100T and the number of entries in the matrix approximated System 130 matrix is $P \times F_1 T$ or 40×100T.

Figure 8A:
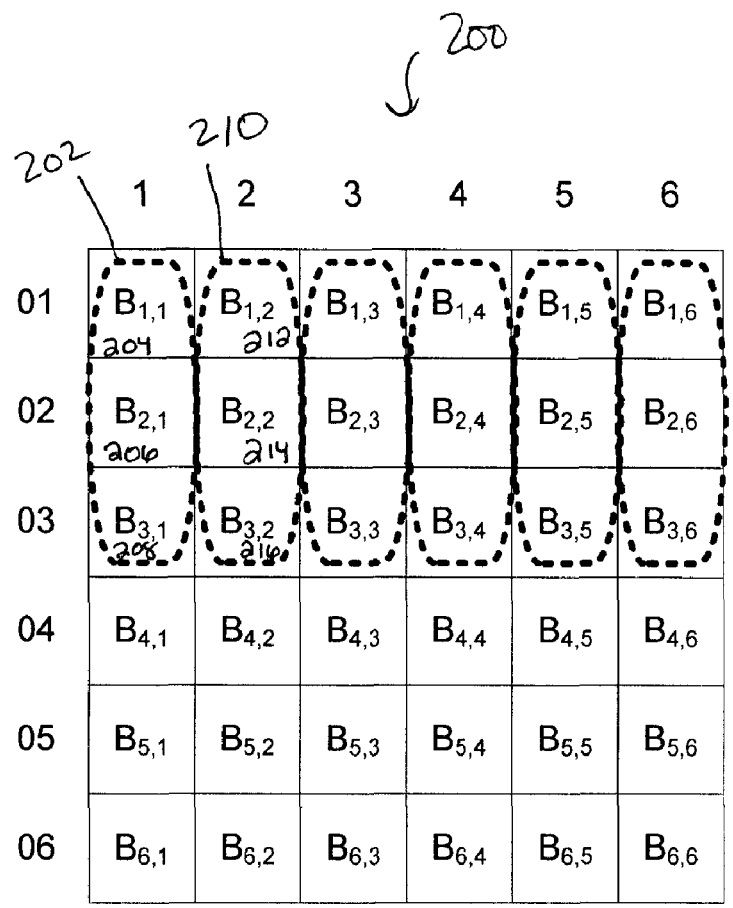
FIG. 8A shows a portion of the matrix of FIG. 6.
Figure 8B:
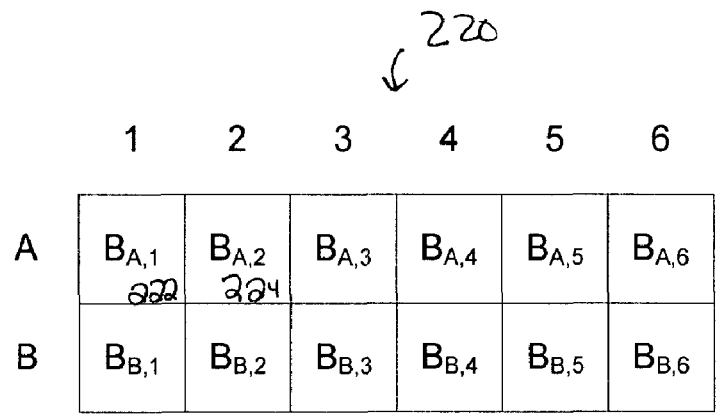
FIG. 8B shows a portion of a reduced matrix generated based on the matrix of FIG. 8A.

As described above, the multiresolution system 100 can be generated by letting the matrix 170 be approximated by performing a transformation the matrix 170 to generate a smaller matrix. Another example method for matrix reduction is to reduce the number of entries in the matrix in the time dimension as shown in FIGS. 8A and 8B. FIG. 8A shows a portion 200 of the matrix 170 and FIG. 8B shows a portion of the reduced matrix subsequent to the transformation of the matrix in FIG. 8A. The size of the matrix 200 is reduced by lowering the effective framerate of the matrix by merging entries for multiple frames in matrix 200. For example, assuming that entries 204, 206, and 208 are sequential time frame entries for a particular phoneme, the entries 204, 206, and 208 can be grouped as indicated by 202 and merged into entry 222. Similarly, the sequential time entries 212, 214, and 216 for another phoneme can be grouped as indicated by 210 and merged into entry 224. The effective framerate can be reduced by merging scores across multiple frames. Possible methods for this can be to use a downsampling filter, or to take the median, max, min, mean, sum, or other transform of short blocks of frames. Merging the different frames reduces the number of rows in the matrix. If downsampling by three or using blocks of three frames (e.g., as shown in FIGS. 8A and 8B), the effective framerate of the System 130 approximation $\hat{F}_0 = \hat{F}_1/3$. This gives an approximate reduced matrix that is $2P \times \hat{F}_0 T$, or 80×(100/3)T. If a two-state-per-phoneme system having 40 phonemes and a frame rate $F_1$ of 100 per second is reduced to a frame rate of 33 and ⅓ per second, the size of the full matrix is $2P \times F_1 T$, or 80×100T and the size of the matrix approximated System 130 matrix is reduced by a factor of 6 to $$2P \times \frac{F_1}{3}T, \text{ or } 80 \times 33\frac{1}{3}T.$$

Similarly, if a two-state-per-phoneme system having 40 phonemes and a frame rate F1 of 100 per second is reduced to a frame rate of 25 per second, the size of the full matrix is $2P \times F_1 T$, or 80×100T and the size of the matrix approximated System 130 matrix is $$2P \times \frac{F_1}{4}T,$$

or 80×25T.

In some embodiments, the matrix can be reduced in both the time dimension and the number of states per phoneme. For example, as shown in FIGS. 9A and 9B, entries in a matrix 230 can be grouped in both the time dimension (e.g., entries 234, 238 and 242 are grouped and entries 236, 240, and 244 are grouped) and in the states per phoneme (e.g., entries 234 and 236 are grouped, entries 238 and 240 are grouped, and entries 242 and 244 are grouped). As such, six entries total are grouped together when both the reduction based on the time dimension and the number of states per phoneme are combined. For example, in FIG. 9A entries 234, 236, 238, 240, 242, and 244 are grouped as indicated by 232 and are combined into a single entry 262 in the reduced matrix 260. Combining the two methods, results in a matrix that has only ⅙th as many entries as the full matrix. For example, if a two-state-per-phoneme system having 40 phonemes is reduced to just one state-per-phoneme and the effective framerate is reduced by a factor of three, the size of the full matrix is $2P \times F_1 T$, or 80×100T is reduced to $$P \times \frac{F_1}{3}T, \text{ or } 40 \times 33\frac{1}{3}T.$$

Assuming an ideal search algorithm with zero overhead, the approximated reduced index will search 6 times faster than the full matrix.

In some embodiments, a fast implementation of this method is to use vector quantization on the original matrix, where the blocksize used for the vector quantization matches both the reduction-of-states and reduction-of-frames parameters of the approximated matrix. If this is the case, the identical index matrix can be used for both System 130 and the approximated System 132. The only difference is that each VQ index for the System 130 interpretation indexes into a table where each entry contains a 2×3 block of state scores, while the same VQ index, when used in context of the System 132 approximation, indexes only a single scalar value. In this way, only the indexing of System 132 needs to be run, and only the index for System 132 needs to be stored.

Note that as introduced above, although the discussion uses the phrase "word spotting" and words as examples of queries, queries can equally be phrases, or large units such as sentences, or can even form complex expressions, such as combinations of phrases with "wildcard" or optional portions.

Alternative systems that implement the techniques described above can be implemented in software, in firmware, in digital electronic circuitry, or in computer hardware, or in combinations of them. The system can include a computer program product tangibly embodied in a machine-readable storage device for execution by a programmable processor, and method steps can be performed by a programmable processor executing a program of instructions to perform functions by operating on input data and generating output. The system can be implemented in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

It is to be understood that the foregoing description is intended to illustrate and not to limit the scope of the invention, which is defined by the scope of the appended claims. For example, while at least some of the examples above describe a two stage searching process a greater number of stages are possible. For example, a system could be based on a three stage searching process and include three searching processes each of which have an associated index file of varying detail. In another example, a system could include four searching processes each of which have an associated index file of varying detail. In general, if a system includes N searching processes, each of the N searching processes can have a different associated index file which the system uses to search for a particular search term in the audio. In some additional examples, one or more of the N searching processes can use the same index file but rely on a different threshold value for determining if a potential match exists within the audio.

Other embodiments are within the scope of the following claims.

What is claimed:

1. A method for searching an audio source for occurrence of a search string, the method comprising:
    processing the audio source using a computer to generate a first representation of the audio source that includes scores associated with the occurrence of a plurality of audio states;
    generating a second representation of the audio source using a computer, the second representation having a plurality of parts, each part corresponding to a different part of the first representation, the second representation comprising fewer entries than the first representation;
    using a computer, using the search string and the second representation to determine a set of candidate locations in the audio source; and
    searching the candidate locations using a computer using the search string and the first representation.

2. The method of claim 1, wherein generating the second representation of the audio source comprises processing the first representation to generate the second representation.

3. The method of claim 2, wherein:
    processing the audio source to generate the first representation comprises processing the audio source according to a first set of audio states independently of the search string; and
    generating the second representation of the audio source comprises processing the audio source according to a second set of audio states independently of the search string.

4. The method of claim 2, wherein processing the first representation to generate the second representation comprises reducing a number of states in the state dimension.

5. The method of claim 4, wherein the states include states of phonemes and reducing the number of states includes reducing the number of states for at least some of the phonemes.

6. The method of claim 4, wherein reducing the number of states comprises reducing the number of states from two-states-per-phoneme in the first representation to one-state-per-phoneme in the second representation.

7. The method of claim 2, wherein processing the first representation to generate the second representation comprises merging phonemes in the first representation by class to generate the second representation.

8. The method of claim 7, wherein reducing the frame rate comprises reducing the frame rate by a factor of 3 or greater.

9. The method of claim 2, wherein processing the first representation to generate the representation comprises reducing a frame rate.

10. The method of claim 2, wherein processing the first representation to generate the second representation comprises reducing a number of states and reducing a frame rate.

11. The method of claim 2, wherein processing the first matrix to generate the second matrix comprises:
    reducing a number of states by a factor of at least about 2; and
    reducing a frame rate by a factor of at least about 3.

12. The method of claim 1, wherein:
    the first representation comprises a first matrix having a time frame dimension and a state dimension, wherein the probabilities associated with the occurrence of a plurality of audio states are stored as entries in the first matrix; and the second representation comprises a second matrix having a time frame dimension and a state dimension, the second matrix having fewer entries than the first matrix.

13. The method of claim 12, wherein generating the second representation of the audio source comprises processing the first matrix to generate the second matrix.

14. The method of claim 13, wherein processing the first matrix to generate the second matrix comprises reducing a number of states.

15. The method of claim 14, wherein each part of the second representation comprises a quantization of quantities in the corresponding part of the first representation.

16. The method of claim 1, wherein:
the first representation comprises a first lattice; and
the second representation comprises a second lattice, the second lattice having fewer entries than the first lattice.

17. The method of claim 16, wherein generating the second representation of the audio source comprises processing the first lattice to generate the second lattice.

18. The method of claim 17, wherein states of the second representation correspond to classes of states of the first representation.

19. The method of claim 1, further comprising:
accepting the search string;
generating a first representation of the search string for use with the first representation of the audio source; and
generating a second representation of the search string for use with the second representation of the audio source.

20. The method of claim 19, wherein:
using the search string and the second representation to determine a set of candidate locations in the audio source comprises using the second representation of the search string and the second representation of the audio source to determine a set of candidate locations in the audio source; and
searching the candidate locations using the search string and the first representation comprises searching the candidate locations using the first representation of the search string and the first representation of the audio source.

21. The method of claim 1, the method further comprising:
generating a third representation of the audio source, the third representation having a plurality of parts, each part in the first representation corresponding to a different part of the third representation, the first representation comprising fewer entries than the third representation.

22. The method of claim 21, wherein:
the set of candidate locations comprises a first set of candidate locations; and
searching the candidate locations using the search string and the first representation comprises generating a second set of candidate locations, and the method further comprises:
searching the second set of candidate locations using the search string and the third representation.

23. A method for searching an audio source for occurrence of a search string, the method comprising:
processing the audio source using a computer to generate a first matrix or lattice, the first matrix or lattice including probabilities associated with the occurrence of a plurality of audio states within a time frame;
processing the first matrix or lattice using a computer to generate a second matrix or lattice that includes probabilities associated with the occurrence of a plurality of audio states within a time frame, the second matrix or lattice having fewer entries than the first matrix or lattice;
determining, using a computer, a set of candidate locations in the audio source by searching for the search string using the second matrix or lattice; and
searching the candidate locations using a computer using the search string and the first matrix or lattice.

24. A method for searching an audio source for occurrence of a search string, the method comprising:
processing the audio source using a computer according to a first set of audio states independently of the search string;
storing, using a computer, for a plurality of time frames, a first set of quantities characterizing probabilities associated with the occurrence of each of the audio states in the first set of audio states;
processing the audio source using a computer according to a second set of audio states independently of the search string;
storing, using a computer, for a plurality of time frames, a second set of quantities characterizing probabilities associated with the occurrence of each of the audio states in the second set of audio states, the second set of audio states comprising fewer audio states than the first set of audio states;
accepting the search string using a computer;
using a computer, using the search string and the second set of quantities to identify a set of candidate locations in the audio source; and
using a computer, using the search string and the first set of to search for the search string within the identified candidate locations.

25. The method of claim 24, further comprising providing a set of one or more hits for the search string in the audio source based on a result of the search of the candidate locations.

26. The method of claim 24, wherein
said first set of audio states comprise $R_1$ plus $M_1$ time $N_1$ states, where $M_1$ is a number of states per phoneme, $N_1$ is a number of different phonemes, and $R_1$ is a number of bridge states;
said second set of audio states comprise $R_2$ plus $M_2$ time $N_2$ states, where $M_2$ is a number of states per phoneme, $N_2$ is a number of different phonemes, and $R_2$ is a number of bridge states; and
$M_1$ is less than $M_2$.

27. The method of claim 24, wherein
said first set of audio states comprise $R_1$ plus $M_1$ time $N_1$ states, where $M_1$ is a number of states per phoneme, $N_1$ is a number of different phonemes, and $R_1$ is a number of bridge states;
said second set of audio states comprise $R_2$ plus $M_2$ time $N_2$ states, where $M_2$ is a number of states per phoneme, $N_2$ is a number of different phonemes, and $R_2$ is a number of bridge states; and
$N_1$ is less than $N_2$.

28. The method of claim 24, wherein:
processing the audio source according to a first set of audio states comprises constructing a first matrix having a time frame dimension and a state dimension, each entry in the first matrix representing a quantity characterizing a probability of an audio state occurring in a time frame; and
processing the audio source according to a second set of audio states comprises constructing a second matrix having a time frame dimension and a state dimension, each entry in the second matrix representing a quantity characterizing a probability of an audio state occurring in a time frame, the second matrix having less entries in the time frame dimension that the first matrix.

29. The method of claim 24, wherein the set of candidate locations comprise locations in the audio source having a shorter duration than the entire audio source.

* * * * *